United States Patent [19]
Kojima et al.

[11] Patent Number: 5,485,545
[45] Date of Patent: Jan. 16, 1996

[54] CONTROL METHOD USING NEURAL NETWORKS AND A VOLTAGE/REACTIVE-POWER CONTROLLER FOR A POWER SYSTEM USING THE CONTROL METHOD

[75] Inventors: Yasuhiro Kojima; Yoshio Izui; Tadahiro Goda; Sumie Kyomoto, all of Hyogo, Japan

[73] Assignee: Mitsubishi Denki Kabushiki Kaisha, Tokyo, Japan

[21] Appl. No.: 295,072

[22] Filed: Aug. 26, 1994

Related U.S. Application Data

[63] Continuation-in-part of Ser. No. 899,422, Jun. 17, 1992, abandoned.

[30] Foreign Application Priority Data

Jun. 20, 1991 [JP] Japan ..................... 3-174735

[51] Int. Cl.[6] ..................... G06F 15/20
[52] U.S. Cl. ..................... 395/22; 395/23
[58] Field of Search ..................... 395/21, 22, 23, 395/24

[56] References Cited

U.S. PATENT DOCUMENTS

| | | | |
|---|---|---|---|
| 4,990,838 | 2/1991 | Kawato et al. | 395/22 |
| 5,052,043 | 9/1991 | Gaborski | 395/22 |
| 5,095,443 | 3/1992 | Watanabe | 395/11 |
| 5,111,531 | 5/1992 | Grayson et al. | 395/22 |
| 5,119,468 | 6/1992 | Owens | 395/22 |
| 5,197,114 | 3/1993 | Skeirik | 395/22 |
| 5,204,872 | 4/1993 | Staib et al. | 395/22 |

OTHER PUBLICATIONS

R. J. Williams et al., "A Learning Algorithm for Continually Running Fully Recurrent Neural Netowrks", Neural Computation, 1989, pp. 270–280.

Bialasiewicz et al, "Neural Network Modeling of Dynamical Systems", 1990 Int'l IEEE Symposium on Intelligent Control, Sep. 5–7 1990 pp. 500–505 vol. 1.

Mori et al, "Power System Harmonics Prediction with an Artificial Neural Network", 1991 IEEE Int'l Symposium on Circuits & Systems, Jun. 11–14, 1991, pp. 1129–1132 vol. 2.

*Primary Examiner*—Robert W. Downs
*Attorney, Agent, or Firm*—Rothwell, Figg, Ernst & Kurz

[57] ABSTRACT

A neural network apparatus and method for use in applications such as in a voltage/reactive-power controller in which a neuro control-object simulator and a neuro controller pre-learn so as to make input-output relations of the controller match the input-output relations of a control unit and so as to make input-output relations of the simulator match input-output relations of a control object. The controller re-learns so as to make the output of the simulator match an input corresponding to a desired output of the control object. After re-learning, the controller controls the control-object.

6 Claims, 21 Drawing Sheets

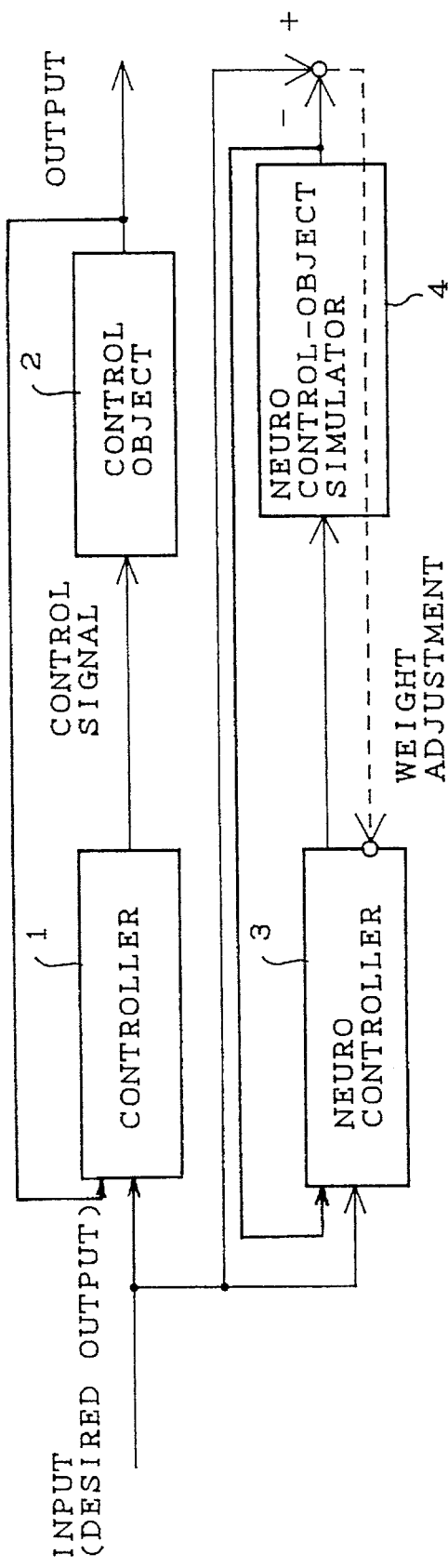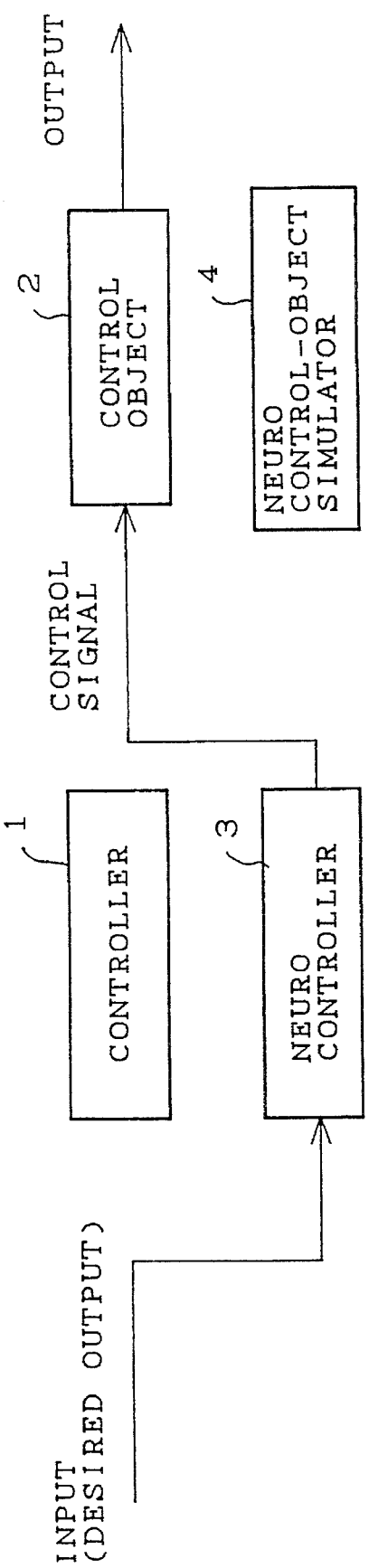

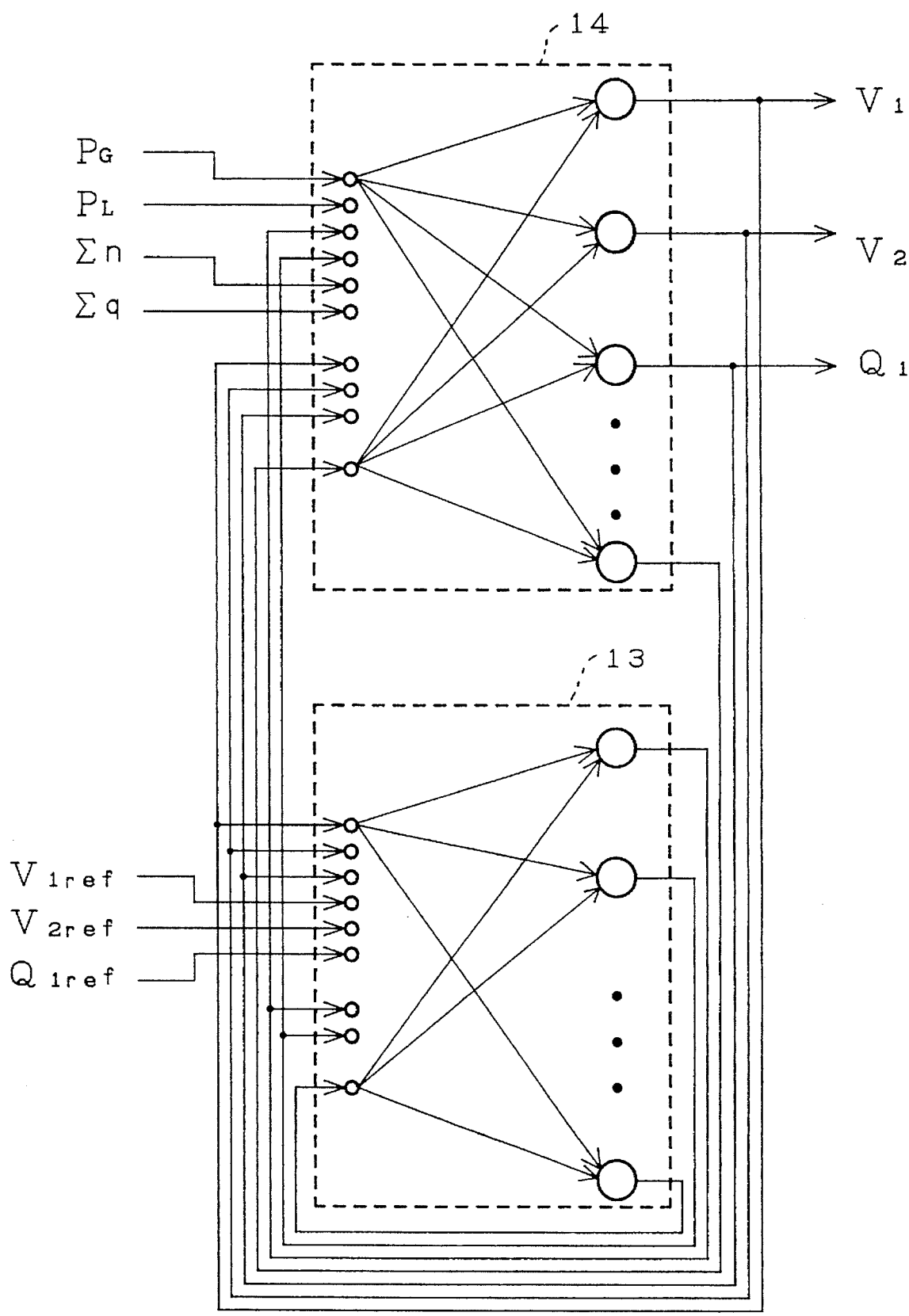

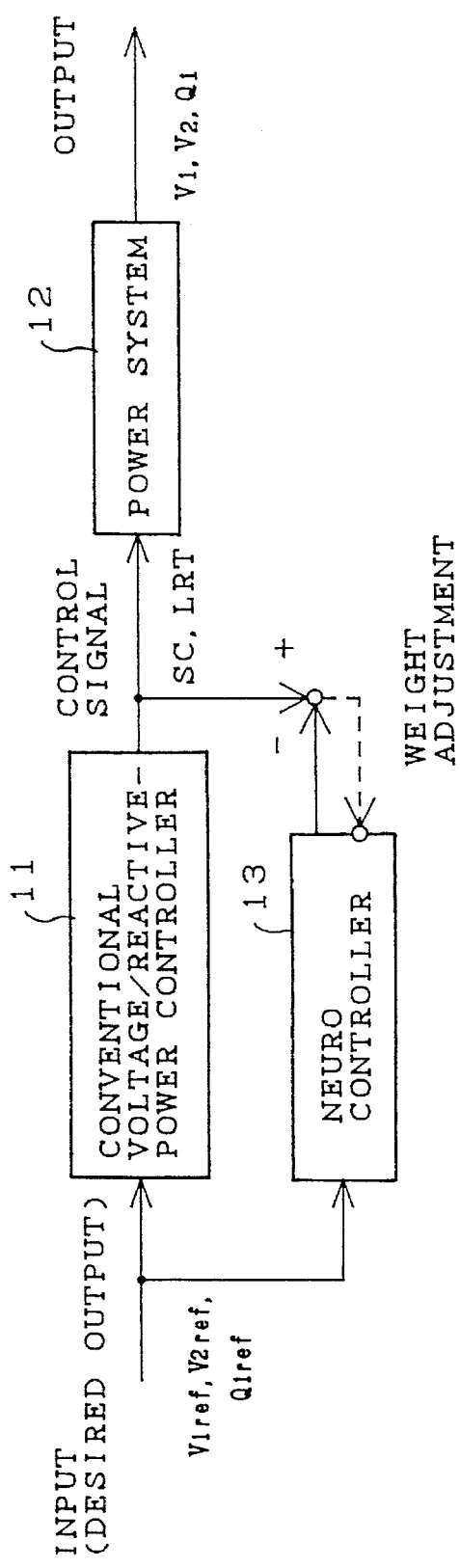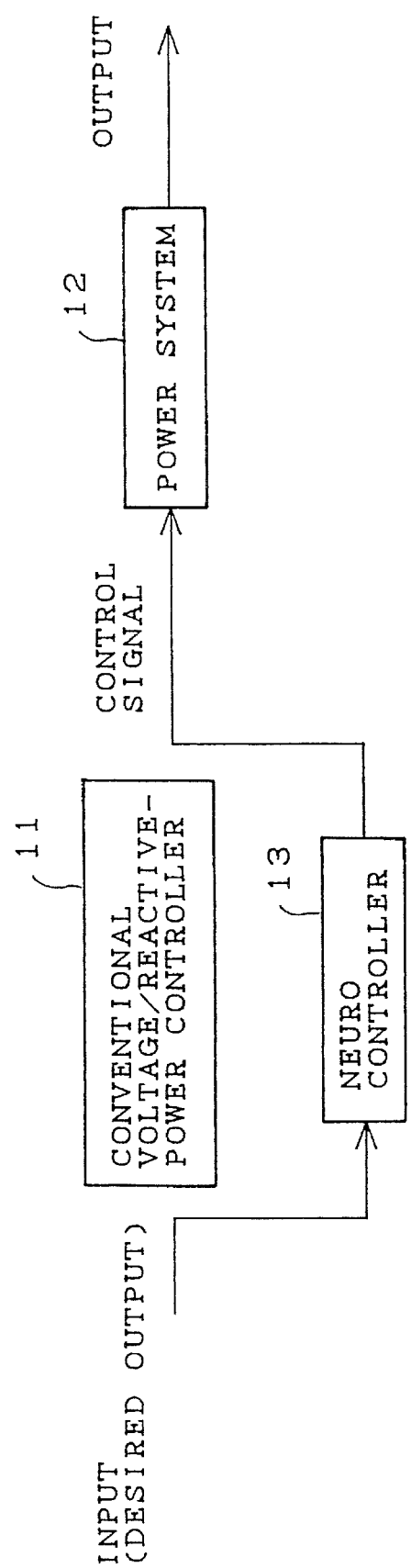
FIG. 22a
FIG. 22b

CONTROL METHOD USING NEURAL NETWORKS AND A VOLTAGE/REACTIVE-POWER CONTROLLER FOR A POWER SYSTEM USING THE CONTROL METHOD

This is a continuation-in-part of application Ser. No. 07/899,422, filed Jun. 17, 1992, now abandoned.

BACKGROUND OF THE INVENTION

1. Field of the Invention

The present invention relates to a control method effective for controlling a control object which rarely has static characteristics because it is a large-scale system or includes non-linearity, or a control object which cannot be well controlled by the conventional controller such as voltage/reactive-power of a power system, an automatically moving robot, a large-scale industrial plant, a rotating machinery e.g. a generator, an automatically navigator of a ship etc. or jets of fuel in an internal combustion engine etc., for example.

2. Description of the Prior Art

FIG. 1 is a conceptual diagram showing a typical control technique adopted by the conventional voltage/reactive-power controller described in Report 946 with the title "Development of a Voltage/Reactive-Power Controller" disclosed by M. Suzuki et al. in a national convention of the Society of Electrical Engineers of Japan which was held in the year of 1987. Reference numeral 18 shown in the figure is a dead zone in the central area of coordinate axes whereas reference numerals 19 each denote an operation-changeover line extended from the dead zone 18 in one of the four directions.

Next, the principle of operation of the conventional voltage/reactive-power controller is described. A voltage/reactive-power controller adopting the conventional control technique has a control plane with a pattern approximating the characteristics of a power system which are established with relations among the primary and secondary voltages $V_1$ and $V_2$ and the primary reactive power $Q_1$ of its transformer used as a base. The voltage/reactive-power controller sustains the primary and secondary voltages $V_1$ and $V_2$ and the primary reactive power $Q_1$ of the transformer at their target values by moving the tap of the load tap-changer up and down or controlling the input switching of a shunt reactor (SHR) and a synchronous condenser (SC) serving as a phase adjuster based on the pattern on the control plane shown in FIG. 1.

Since the conventional control technique is implemented as described above, the control characteristics are much affected by the pattern on the control plane set in the controller. It is difficult, on the other hand, to properly set a pattern on the control plane. It is therefore hard to give satisfactory control characteristics. In addition, since the effect of moving the tap up and down and controlling the input switching of the shunt reactor (SHR) and the synchronous condenser (SC) is not smooth, the conventional control technique gives rise to a problem that hunting or the like may result if the dead zone 18 is not set properly.

SUMMARY OF THE INVENTION

The present invention is introduced to solve the above problems. It is an object of the present invention to provide a control technique that allows control characteristics to be implemented by taking dynamic characteristics of a control object into consideration without carrying out a cumbersome task of setting of a pattern on the control plane.

It is another object of the present invention to provide a voltage/reactive-power controller that can control the voltages and reactive power so that they remain at suitable values at a high speed without the need to approximate the characteristics of the power system.

The control technique provided by the present invention is implemented by a neuro control-object simulator in addition to a neuro controller made up of the neural network. In this case, the control technique comprises a pre-learning step by the neural network to make the input-output relations of the neuro controller the same as those of the conventional controller and the input-output relations of the neuro control-object simulator the same as those of the real control object, followed by a step of connecting the output of the neuro controller to the input of the neuro control-object simulator. Next, the control technique also includes a learning step by the neural network of the neuro controller to make the output of the neuro control-object simulator match the input of the neuro controller, and a step of controlling the control object by the neuro controller. In this control technique, the neural network learns control characteristics based on the characteristics of the control object by adopting a learning algorithm before implementing control actions on the control object. Accordingly, the control technique can be applied to an object even if the object would result in unsatisfactory control characteristics should the conventional controller be used or even if it is difficult to grasp the characteristics of the object or to determine control rules of the apparatus in advance.

As another embodiment, the control technique provided by the present invention makes use of a neuro controller which is made up of a neural network for carrying out the same functions as the conventional controller. The control technique comprises a learning step by the neural network to make the input-output relations of the neuro controller the same as those of the conventional controller and a step of controlling the control object by the neuro controller. This control technique allows the functions of the conventional controller to be accomplished by the neural network. As a result, the control processing can be done at a higher speed and, in addition, the configuration of the controller can also be simplified as well.

In addition, the voltage/reactive-power controller provided by the present invention for controlling a power system, the neuro controller, which is made up of a neural network having undergone a pre-learning process to make the input-output relations the same as those of the conventional one, is connected to a neuro power-system simulator so that necessary information can be exchanged between the controller and the simulator. The neuro controller, which has undergone a learning process to make the output of the neuro power-system simulator match the input of the neuro controller, controls a power system. The output of the neural-network controller, which is made of a neural network having undergone a learning process to make its own input-output relations the same as those of the conventional voltage-reactive power controller, is connected to the input of the neuro power-system simulator made up of a neural network which has similarly completed a pre-learning process to make its input-output relations the same as those of the power system. The neuro controller controls the power system after letting its neural network finish a learning process to make the output of the neuro power-system simulator match the input of the neuro controller. As a result, a voltage/reactive-power controller for a power system capable of controlling the voltages and the reactive power to appropriate values at a high speed without the need to approximate the characteristics of the power system can thus be implemented.

In another embodiment implementing the voltage/reactive-power controller in accordance with the present invention is a neuro voltage/reactive-power controller made up of a neural network which has undergone a learning process to make the input-output relations the same as those of the conventional voltage/reactive-power controller. Therefore, the neuro controller controls the power system not before its neural network has completed the learning process to make the input-output relations of its own the same as those of the conventional voltage/reactive-power controller. As a result, a voltage/reactive-power controller for power systems capable of controlling the voltages and reactive power to proper values at a high speed can be realized.

BRIEF DESCRIPTION OF THE DRAWINGS

FIG. 3 is a conceptual diagram showing a second learning phase of a control technique adopted by the first embodiment according to the present invention.

FIG. 4 is a conceptual diagram showing an operating state of the control technique adopted by the first embodiment.

FIG. 16 is a diagram showing the configuration of a neural network at a second learning phase of a sixth embodiment.

FIGS. 22(a) and 22(b) are conceptual diagrams showing a tenth embodiment according to the present invention.

DETAILED DESCRIPTION OF THE PREFERRED EMBODIMENTS

Referring to the diagrams described above, embodiments according to the present invention are described as follows.

Figure 2:
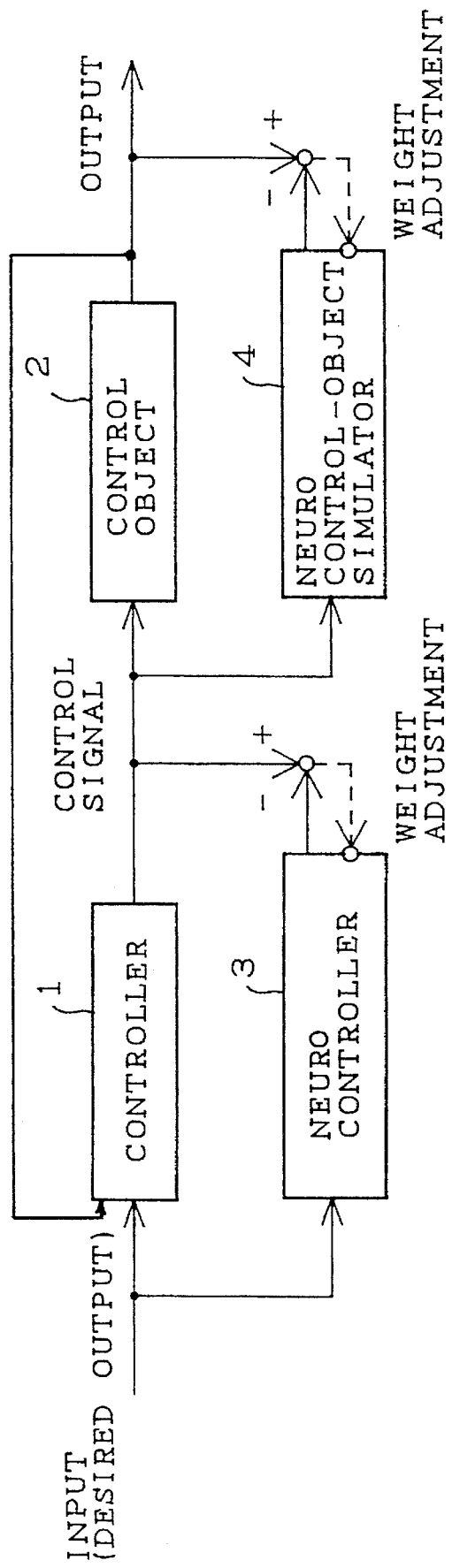
FIG. 2 is a conceptual diagram showing a first learning phase of a control technique adopted by a first embodiment according to the present invention.

FIGS. 2 to 4 are conceptual diagrams used for explaining a control technique implemented by a first embodiment in accordance with the present invention. FIGS. 2 and 3 are conceptual diagrams showing a first and second learning phases respectively whereas FIG. 4 is a conceptual diagram showing an operating state of the controller after the completion of the two learning phases. As such, the learning process in this embodiment is divided into two stages.

Numeral references 1 shown in FIGS. 2 to 4 each denote the conventional controller such as a voltage/reactive-power controller. Numeral references 2 are each a real control object controlled by the conventional controller 1. Numeral references 3 each denote a neuro controller which implements functions of the conventional controller 1 by means of a neural network. Numeral references 4 are each a neuro control-object simulator which is also made up of a neural network to behave like the control object 2.

Next, the principle of operation is described. At the first learning phase, i.e. pre-learning phase shown in FIG. 2, the neuro controller 3 and the neuro control object simulator 4, which are each made up of a neural network as described above, learn dynamic characteristics of the conventional controller 1 and the real control object 2 respectively. At the first learning phase, the same input is supplied to both the conventional controller 1 and the neuro controller 3. Similarly, the same input is supplied to both the real control object 2 and the neuro control-object simulator 4. At that time, the neuro controller 3 and the neuro control-object simulator 4 adjust their weights of connection among the neural nodes therein so that the output of the neuro control-object simulator 4 matches that of the real control object 2. Typically, the aforementioned algorithm provided by Williams et al. can be used as a rule according to which the weights of connection among the neural nodes are adjusted.

An algorithm described in a paper with the title "A Learning Algorithm for Continually Running Fully Recurrent Neural Networks" presented by R. J. Williams et al. and disclosed in Issues 1 and 2 of Neural Computation of 1989 is used as rules according to which the weights are adjusted.

Figure 5:
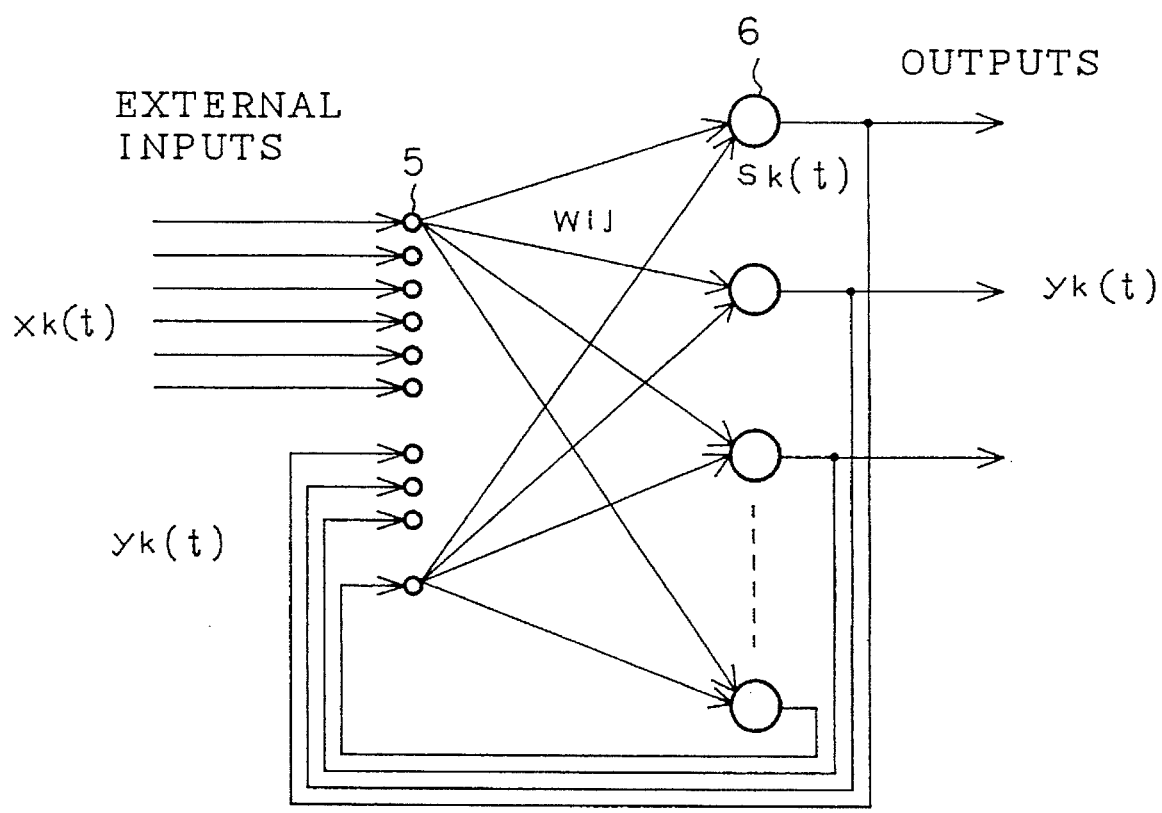
FIG. 5 is a diagram showing the configuration of a typical reccurrent neural network used in the controller.

Let us think of a recurrent neural network shown in FIG. 5. As shown in the figure, external inputs $x_k(t)$ are supplied from the outside world to an input layer 5. $y_k(t)$ is feedbacks output by neural nodes 6. Let sets of these inputs and outputs index k be U and I respectively. Overall inputs are defined by Equation (1) as follows:

$$z_k(t) = \begin{cases} x_k(t) & \text{if } k \in I \\ y_k(t) & \text{if } k \in U \end{cases} \quad (1)$$

The input to the k-th neuron (neural node) $s_k(t)$ is given by Equation (2) and its output $y_k(t+1)$ at next time step is expressed by Equation (3) as follows:

$$s_k(t) = \sum_{l \in U \cup I} w_{kl} z_l(t) \tag{2}$$

$$y_k(t+1) = f_k[s_k(t)] \tag{3}$$

where $w_{kl}$ is a weight of junction between the k-th neuron and an l-th neuron and $f_k$ is an input-output relation.

Let us define a set of k in which a target value $d_k(t)$ for the output $y_k(t)$ exists as $T(t)$. An error function $e_k(t)$ can then be defined by Equation (4) as follows:

$$e_k(t) = \begin{cases} d_k(t) - y_k(t) & \text{if } k \in T(t) \\ 0 & \text{otherwise} \end{cases} \tag{4}$$

J(t), an evaluation function, is $$J(t) = \frac{1}{2} \sum_{k \in U} [e_k(t)]^2 \tag{5}$$

If the weights of junction are to be changed from time to time, the amount of change is found by using the steepest-drop law given by Equation (6) as follows:

$$\Delta w_{ij}(t) = -\alpha \frac{\partial J(t)}{\partial w_{ij}} \tag{6}$$

where $\alpha$ is a positive learning constant.

Here, the partial-differential term on the right side of Equation (6) can be modified into the right side of Equation (7). Computing the partial-differential term on the right side of Equation (7) yields the right side of Equation (8), where $\delta_{ij}$ is Kronecker's delta which has a value of "1" for i=k and "0" in other cases.

$$\frac{\partial J(t)}{\partial w_{ij}} = -\sum_{k \in U} e_k(t) \frac{\partial y_k(t)}{\partial w_{ij}} \tag{7}$$

$$\frac{\partial y_k(t+1)}{\partial w_{ij}} = f_k'[s_k(t)] \left[ \sum_{l \in U} w_{kl} \frac{\partial y_l(t)}{\partial w_{ij}} + \delta_{ik} z_j(t) \right] \tag{8}$$

An initial condition is expressed by Equation (9) as follows:

$$\frac{\partial y_k(t_0)}{\partial w_{ij}} = 0. \tag{9}$$

Substituting "p" for the partial-differential terms of Equations (8) and (9) gives Equations (10) and (11) respectively and substituting Equation (7) for the partial-differential term of Equation (6) yields Equation (12) as follows:

$$P_{ij}^k(t+1) = f_k'[s_k(t)] \left[ \sum_{l \in U} w_{kl} P_{ij}^l(t) + \delta_{ik} z_j(t) \right] \tag{10}$$

$$P^k_{ij}(t_0) = 0 \tag{11}$$

$$\Delta w_{ij}(t) = \alpha \sum_{k \in U} e_k(t) P_{ij}^k(t) \tag{12}$$

At the first learning phase, the neuro controller 3 and the neuro control object simulator 4 learn the dynamic characteristics of the conventional controller 1 and the real control object 2 respectively also using the algorithm described above. At the second learning phase, the output of the neuro controller 3 which have gone through the first learning phase is connected to the input of the neuro control-object simulator 4 as shown in FIG. 3 to form a single overall recurrent neural network. The input and output of the overall neural network are compared to each other and the neuro controller 3 adjusts the weights of connection among neural nodes in its neural network so that the input agrees with the output. In this way, the overall recurrent neural network goes through the second learning phase.

As the second learning phase is completed, the neuro controller 3 is connected to the real control object 2 as shown in FIG. 4. In this arrangement, the real control object 2 is controlled by the neuro controller 3 instead of the conventional control apparatus 1.

Figure 6A:
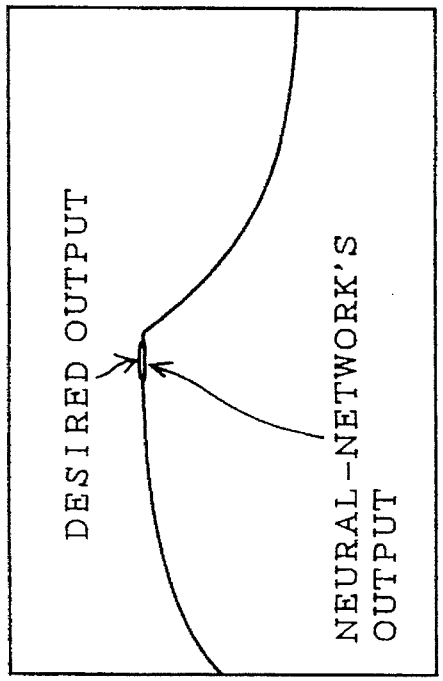
FIGS. 6(a)–6(d) are explanatory diagrams showing the waveforms of inputs and outputs of typical operation carried out by a controller implemented by the first embodiment.
Figure 6B:
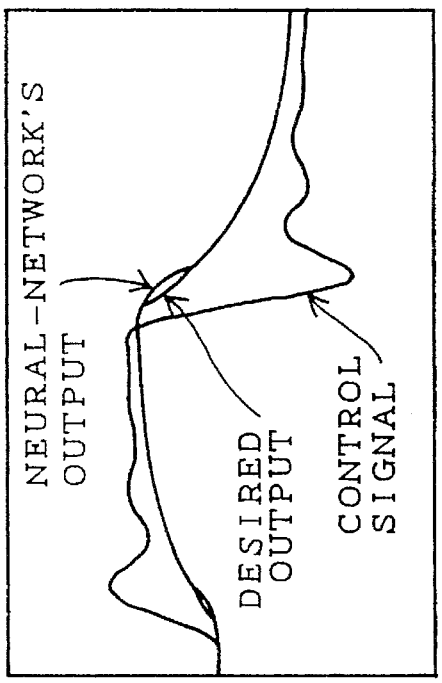
Figure 6C:
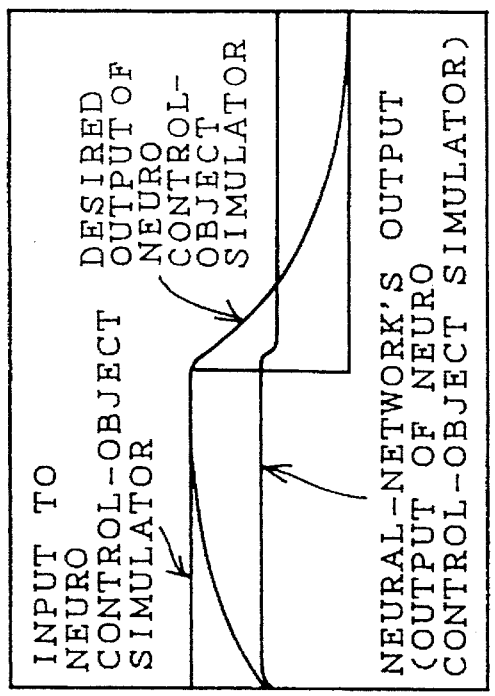

FIG. 6 is explanatory diagrams showing waveforms of inputs and outputs in typical simple operation to which the control technique described above is applied. The configuration of a neural network for the operation is shown in FIG. 7. In this case, the control object 2 has a first-order lagging characteristic. That is to way, the output of the control object 2 approaches a step input like an exponential-function curve as shown in FIG. 6(a).

In this control system, first of all, the neuro control-object simulator 4 learns the first-order lagging characteristic of the control object 2 at the first learning phase. Output waveforms at this learning phase are shown in FIG. 6(b). Next, at the second learning phase, the neuro control-object simulator 4, which has gone through the first learning phase, is connected to the neuro controller 3 completing no particular learning phase. The neuro controller 3 then adjusts the weights of connection among its neural nodes so that the output of the neuro control-object simulator 4 or the output of the neural network matches the input to the neuro controller 3 or the desired output. Waveforms during this adjustment of the weights are shown in FIG. 6(c).

Figure 6D:
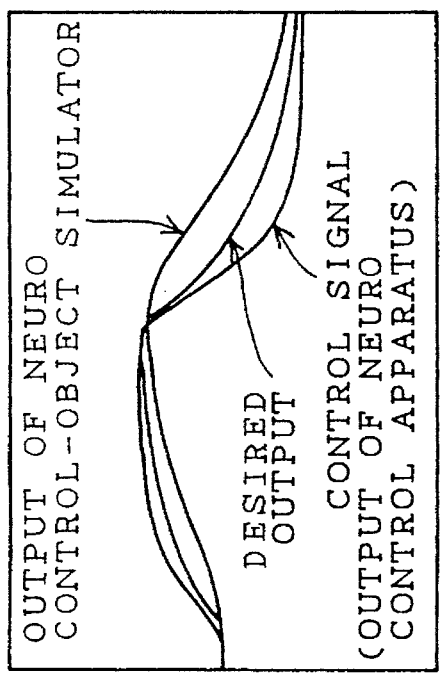
Figure 7:
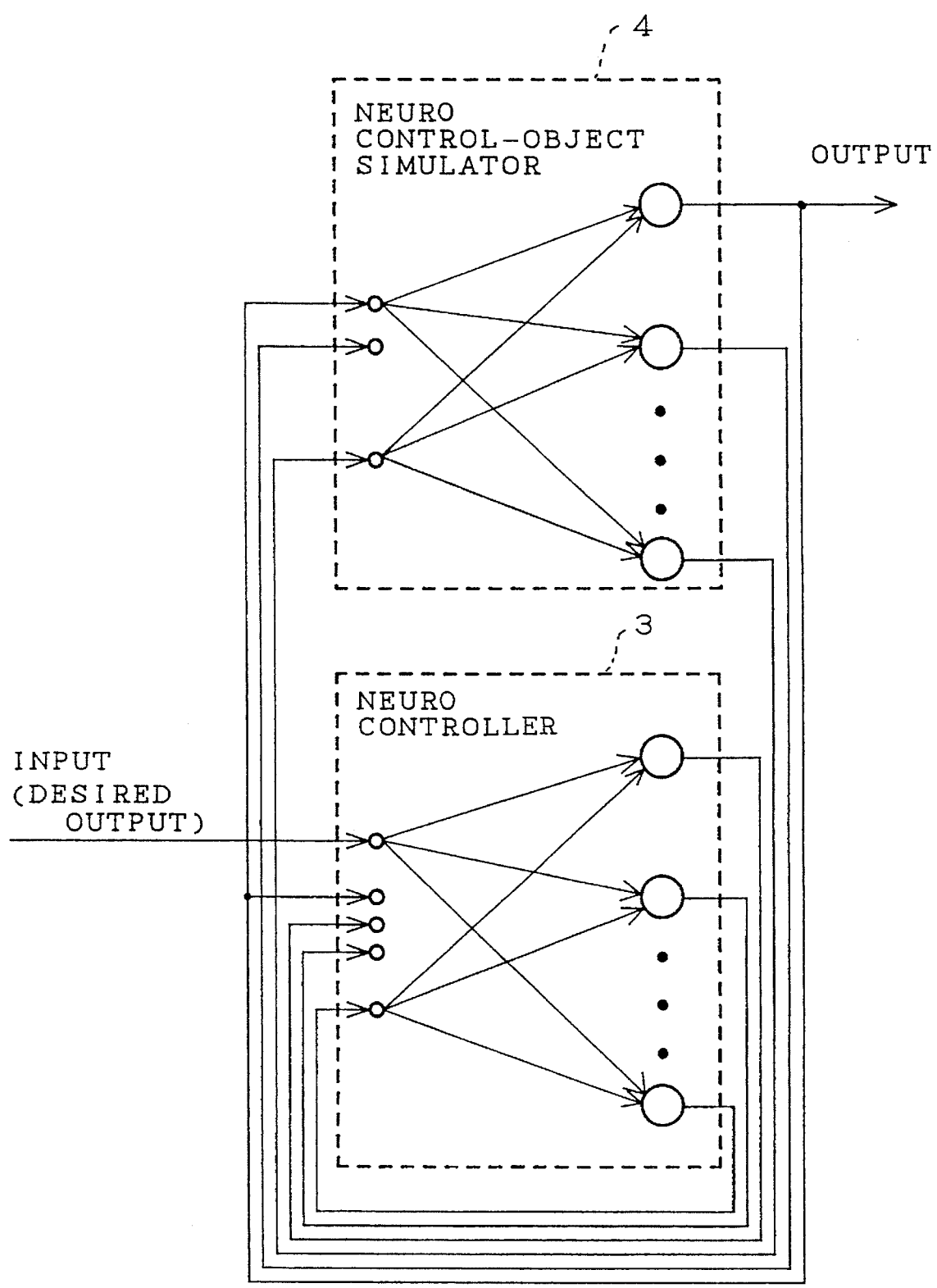
FIG. 7 is a diagram showing the configuration of a typical neural network for the operation.

After the second learning phase has been completed, the output of the neural network almost matches the desired output as is seen in FIG. 6(d). Also at that time, the relation between the input and the output (the control signal) of the neuro controller 3 becomes the same as the relation between the output and the input of the neuro control-object simulator 4. This is because characteristics opposite to those of the neuro control-object simulator 4 have been created in the neural-network controller 3.

Figure 8:
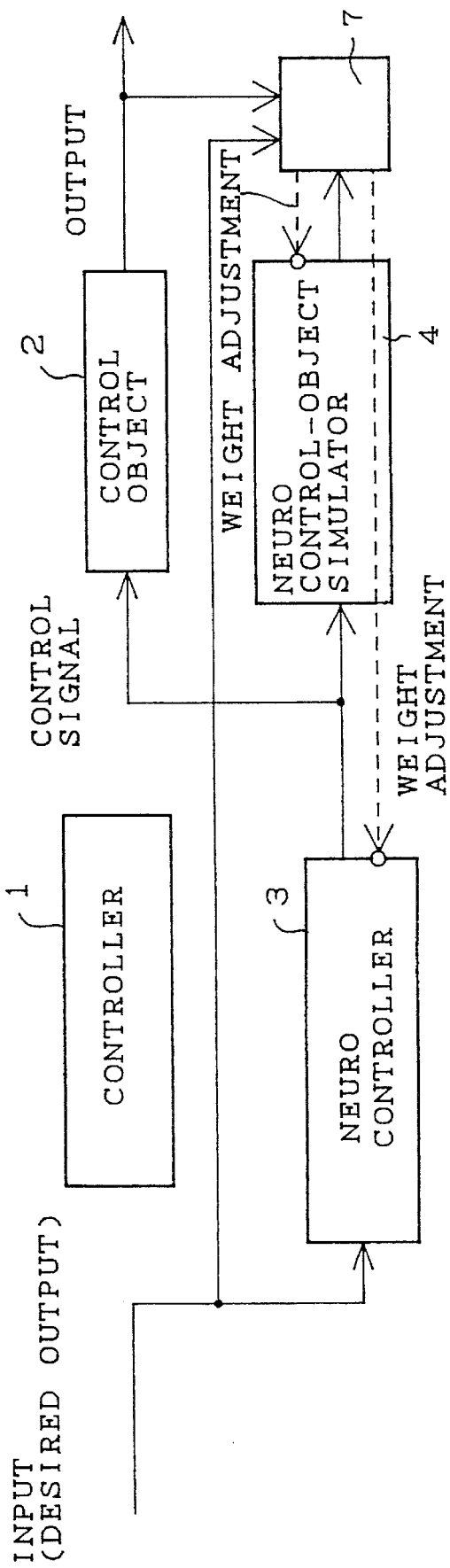
FIG. 8 is a conceptual diagram showing an operating state of a controller implemented by a second embodiment.

FIG. 8 is a conceptual diagram showing an operating state of a controller implemented by a second embodiment in accordance with the present invention. As described in the explanation of the first embodiment, by connecting the neuro controller 3 to the real control object 2, the latter can be controlled by using the former instead of the conventional controller 1. In this arrangement, the outputs of the real control object 2 and the neuro control-object simulator 4 are kept track of by the monitor 7. A difference between both the outputs exceeding a predetermined value is regarded as a variation in dynamic characteristic of the real control object 2. When the monitor 7 detects such a difference, the neuro controller 3 and the neuro control-object simulator 4 are requested to re-learn the variation in dynamic characteristic of the real control object 2 in accordance with, typically, the algorithm provided by Williams et al. In this way, a control technique can thus be implemented for controlling the control object 2 with the dynamic characteristics thereof taken into consideration.

Figure 9:
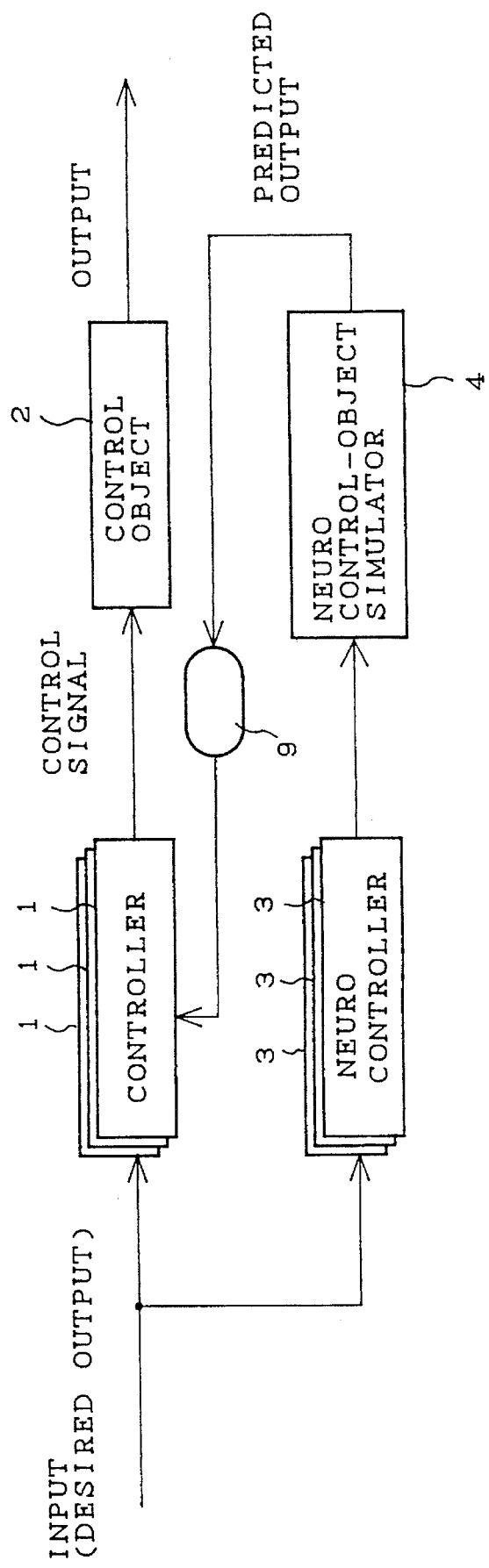
FIG. 9 is a conceptual diagram showing look-ahead control of a control technique adopted by a third embodiment.

FIG. 9 is a conceptual diagram showing look-ahead control of the control technique implemented by a third embodiment in accordance with the present invention. The operation of the neural network after a learning process is carried out at a very high speed. Before the real control object 2 starts operation, the neuro controller 3 and the neuro control-object simulator 4 may simulate the behaviour of the real control object 2 through some control examples. A deciding unit 9 selects one among the control examples that produces the best behaviour of the real control object 2, switching the desired output from the neuro controller 3 to the conventional controller 1 which is then used for controlling the real control object 2. By utilizing parallel computers, the speed of the control processing can be substantially increased.

Figure 1:
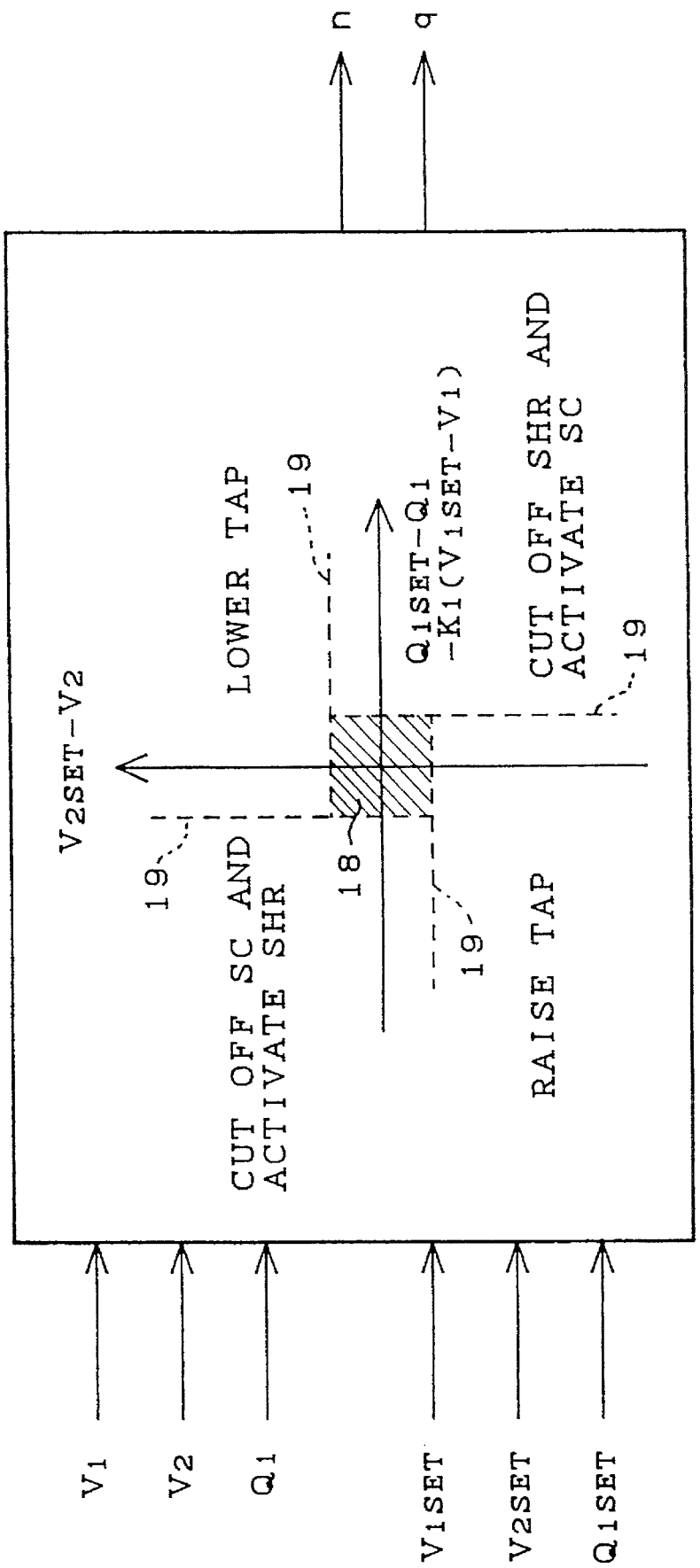
FIG. 1 a conceptual diagram showing the conventional control technique.
Figure 10:
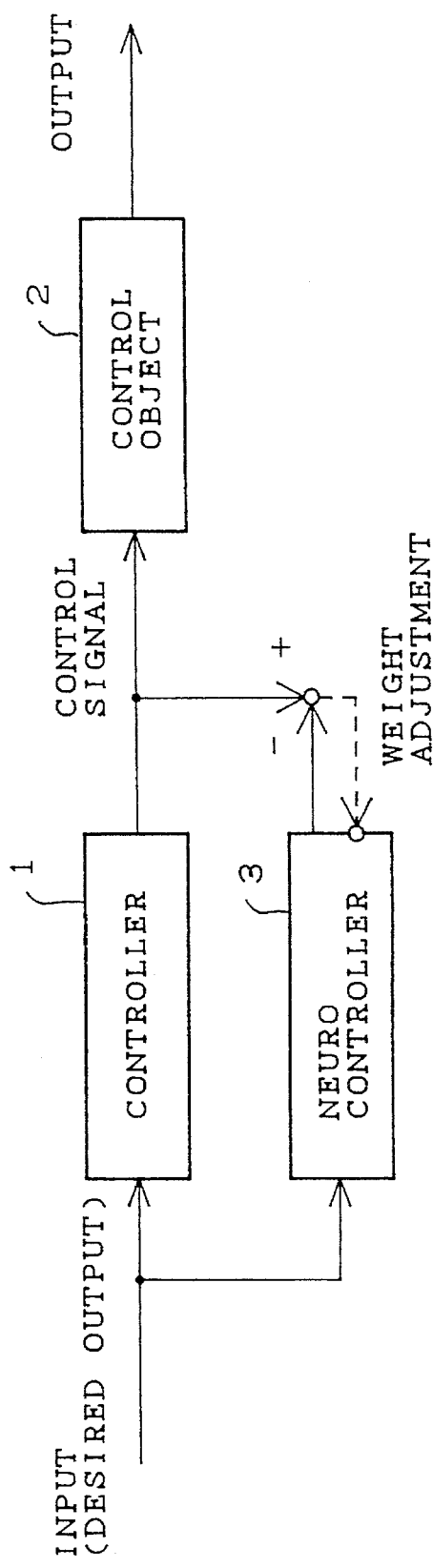
FIG. 10 is a conceptual diagram showing a learning phase of a control technique adopted by a fourth embodiment according to the present invention.
Figure 11:
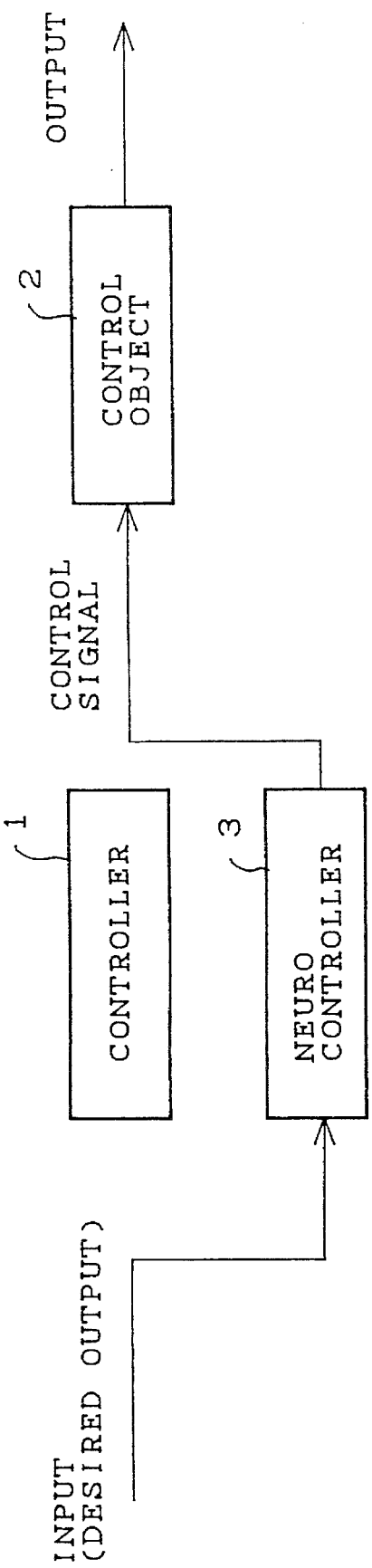
FIG. 11 is a conceptual diagram showing an operating state of a controller implemented by the fourth embodiment.

FIG. 10 is a conceptual diagram showing a learning phase of a fourth embodiment according to the present invention. FIG. 11 is a conceptual diagram showing an operating state of the control apparatus having completed the learning phase. Reference numeral 1 shown in FIG. 10 or 11 are the conventional controller which implement control based on a pattern shown in FIG. 1. Reference numeral 2 denotes a control object whereas reference numeral 3 is a controller made of a neural network.

Next, the principle of operation of the embodiment is described. At the learning phase shown in FIG. 10, the neuro controller 3 learns dynamic characteristics of the conventional controller 1. At the phase for learning the dynamic characteristics, the same input is applied to both the conventional controller 1 and the neuro controller 3. At that time, the neuro controller 3 adjusts weights of connection among its neural nodes so as to make its output match that of the conventional controller 1.

At the learning phase, the neuro controller 3 learns the dynamic characteristics of the conventional controller 1 typically in accordance with the algorithm provided by Williams et al. As the learning phase is completed, the dynamic characteristics of the neuro controller 3 become the same as those of the conventional controller 1. By connecting the neuro controller 3 to the real control object 2 as shown in FIG. 11, the latter can thus be controlled by the former.

Figure 12:
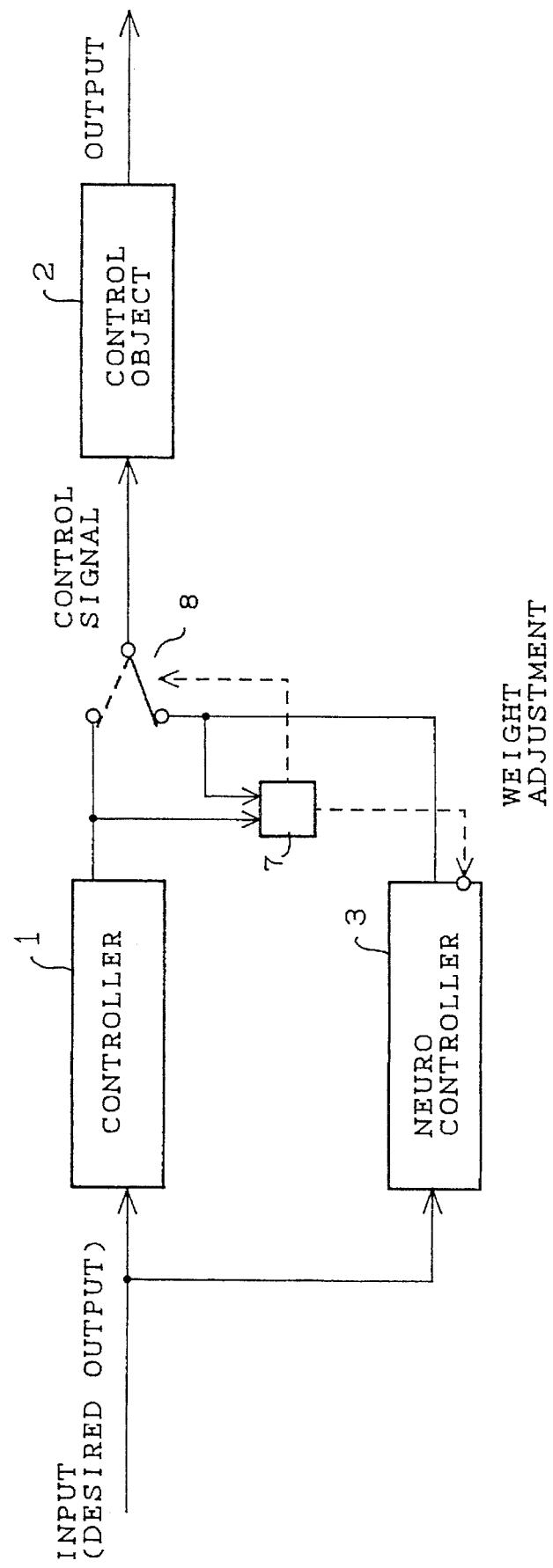
FIG. 12 is a conceptual diagram showing an operating state of a controller implemented by a fifth embodiment in accordance with the present invention.

FIG. 12 is a conceptual diagram showing an operating state in which a control technique embraced by a fifth embodiment according to the present invention is executed. As shown in the figure, when a neuro controller 3 is controlling a real control object 2, a target output is also supplied to a conventional controller 1 as well. The neuro controller 3 then adjusts the weights of connection using typically the aforementioned algorithm provided by Williams et al. until the output of the neuro controller 3 matches that of the conventional controller 1. If the difference in output between the former and the latter exceeds a predetermined value, a monitor 7 detects this phenomenon, actuating a switch 8 so as to connect the real control object 2 to the conventional controller 1. In this way, the neuro controller 3 can learn the dynamic characteristics of the conventional controller 1 while controlling the real control object 2 without the need for going through the learning phase in advance.

Figure 13A:
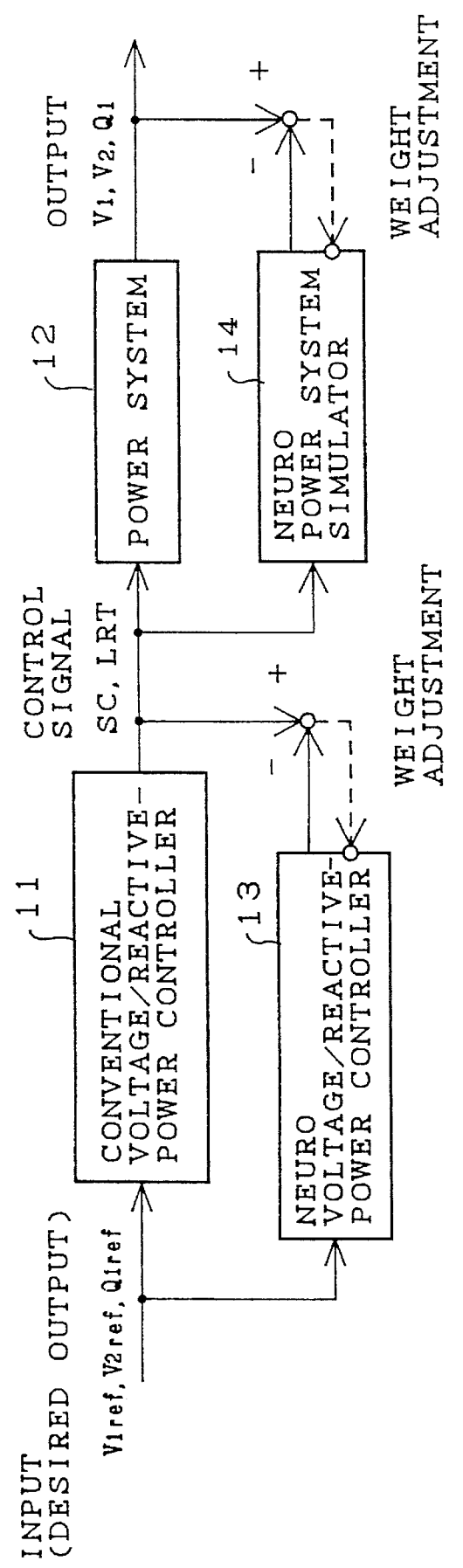
FIGS. 13(a)–13(c) are conceptual diagrams showing a sixth embodiment according to the present invention.
Figure 13B:
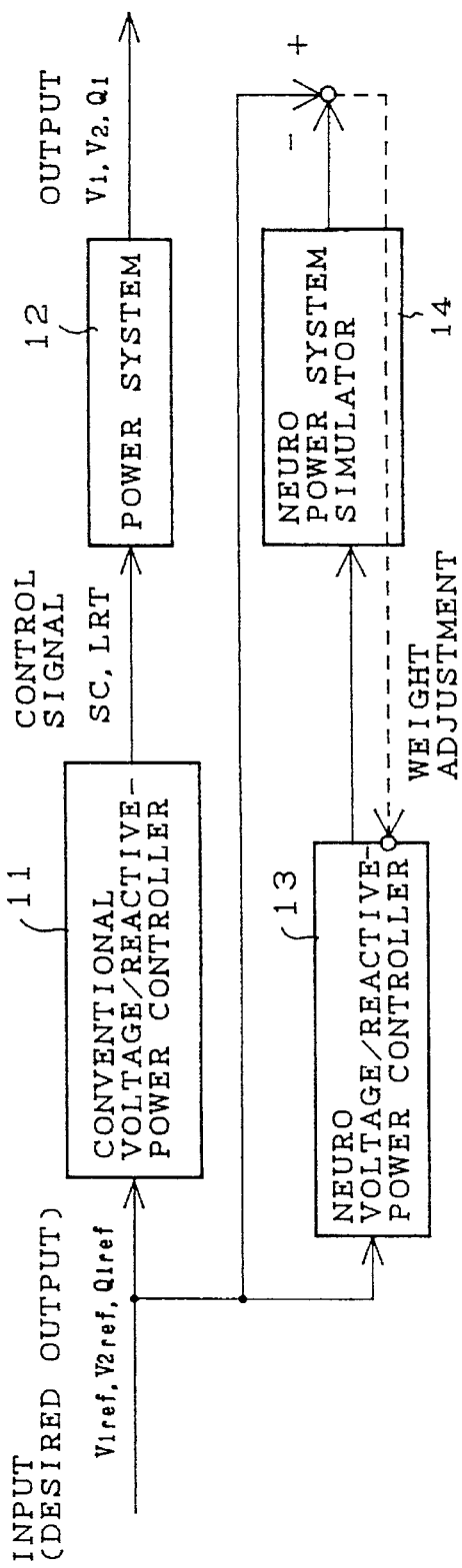
Figure 13C:
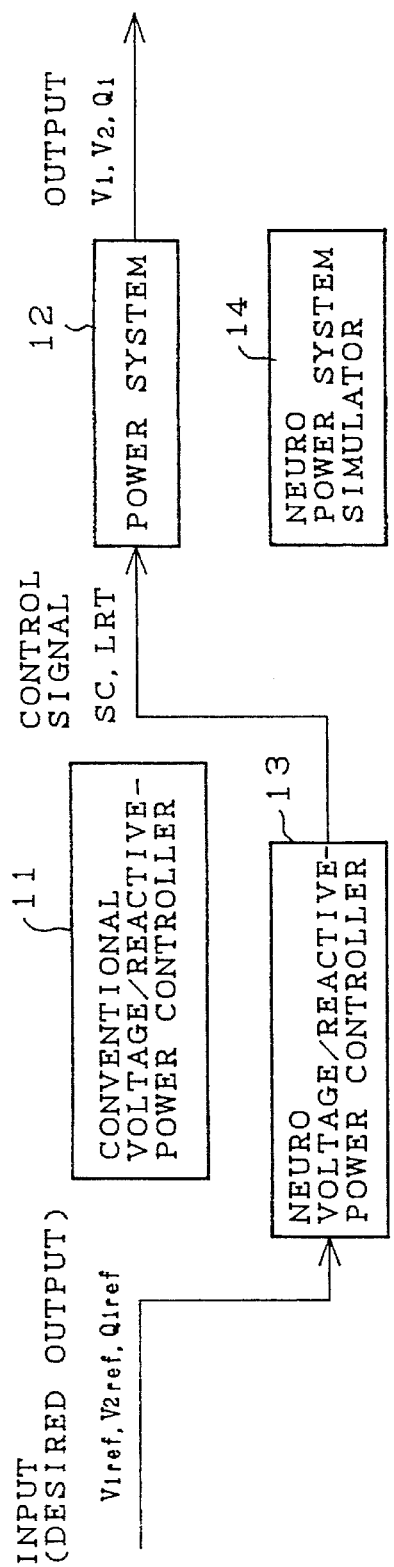
Figure 14:
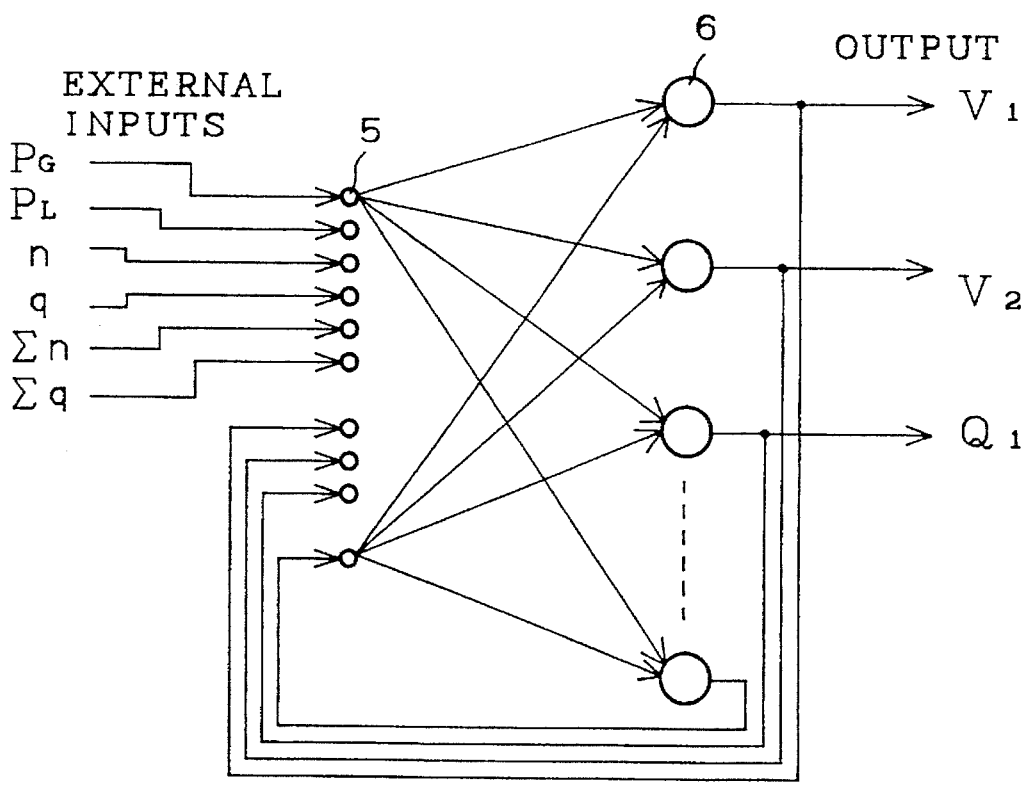
FIG. 14 is a diagram showing the configuration of a neuro power-system simulator.

FIG. 13 are conceptual diagrams used for explaining the principle of operation of a voltage/reactive-power controller which is implemented by a sixth embodiment in accordance with the present invention for controlling a power system. FIG. 13(a), (b) and (c) show first and second learning phases and an operating state respectively. Reference numerals 11 shown in the figure each denote the conventional voltage/reactive-power controller. Reference numerals 14 is each a neuro power-system simulator made up of a neural network for simulating a power system 12. FIG. 14 is a diagram showing a typical configuration of the neuro power-system simulator 14. Note that the recurrent neural network shown in FIG. 5 is used to form the configuration of FIG. 14.

In addition to the control signals (n) and (q) for moving up and down the tap of the tap-changer and for closing and opening the phase adjusting facilities (SC) and (SHR), the active power ($P_G$) of the generator indicating the state of the power system 12, the active power ($P_L$) of the load, a total ($\Sigma$n) of tap values on the transformer's primary winding and a total ($\Sigma$q) of input quantities of the phase adjusting facilities at power-system sites other than the site of this power system controlled by the neural network are supplied to the neuro power-system simulator 14 as external inputs. Outputs given by the neuro power-system simulator 14 are the values $V_1$, $V_2$ and $Q_1$ of the primary and secondary voltages and the reactive power of the transformer which are control results produced thereby. Note that the configuration shown in FIG. 15 will also work well enough for the neuro controller 13.

Control operations are executed in accordance with the procedure adopted by the first embodiment. To be more specific, at the first learning phase shown in FIG. 13(a), the neuro controller 13 and the neuro power-system simulator 14 learn dynamic characteristics of the voltage/reactive-power controller 11 and the power system 12 respectively. At the second learning phase shown in FIG. 13(b), the neuro controller 13 and the neuro power-system simulator 14 are connected to each other through common inputs and outputs as shown in FIG. 16. A whole recurrent neural network comprising the neuro controller 13 and the neuro power-system simulator 14 again go through a learning phase until the inputs and outputs of the joined neural network match each other, that is, until the values of the primary and secondary voltages $V_1$ and $V_2$ and the primary reactive power $Q_1$ of the transformer output by the neuro power-system simulator 14 as control results become equal to the target values $V_{1ref}$, $V_{2ref}$ and $Q_{1ref}$ of the primary and secondary voltages and the primary reactive power of the transformer. At that time, only the weights of connection among the neural nodes in the neuro controller 13 are adjusted. After the second learning phase has been completed, the neuro controller 13 is connected to the real power system 12 as shown in FIG. 13(c).

Figure 17B:
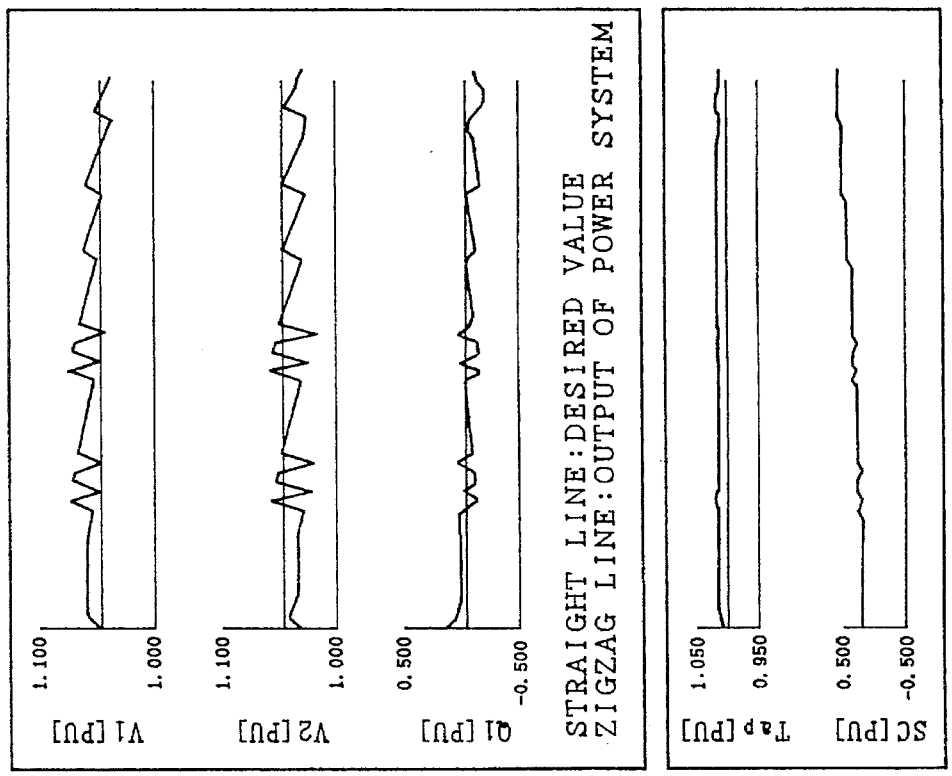
FIGS. 17(a) and 17(b) are an explanatory diagram showing control effects produced by the sixth embodiment.
Figure 17A:
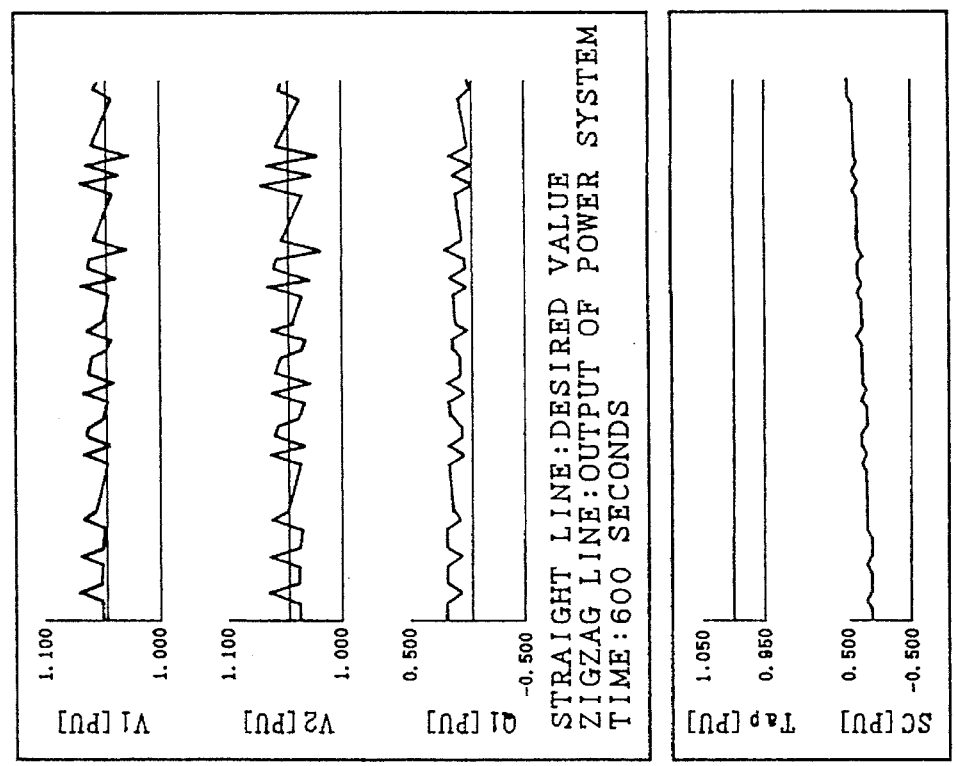

FIG. 17 shows comparison of control results produced by a control mechanism employing the neuro power-system simulator 14 substituting for a real power system and the neuro voltage/reactive-power controller 13, and a mechanism utilizing the conventional voltage/reactive-power controller 11. FIGS. 17(a) and (b) show control results produced by the conventional controller 11 and the controller 13 provided by the present invention respectively. The conventional voltage/reactive-power controller 11 is based on the control plane shown in FIG. 1, operating either the tap changer or the phase adjusting facilities depending upon what position on the control plane the system state is located. On the other hand, it is obvious that the neuro voltage/reactive-power controller 13 controls the power system 12 using both the tap changer and the phase adjusting facilities.

Figure 18:
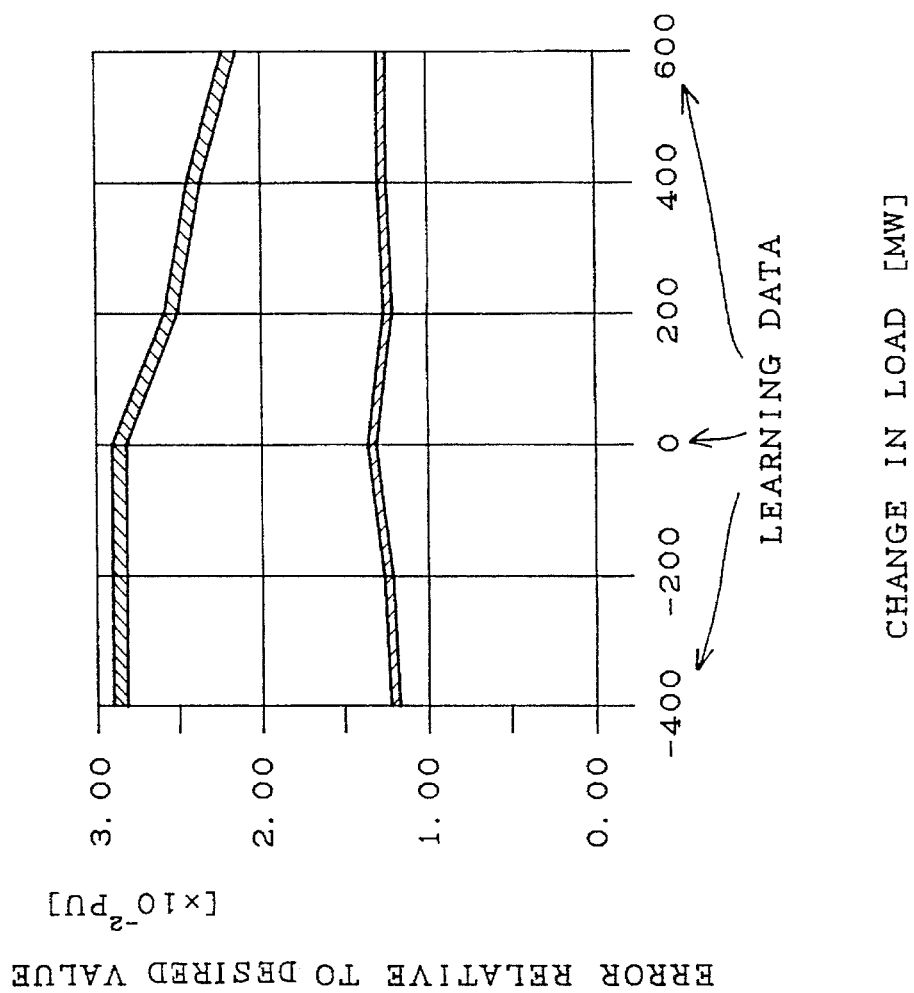
FIG. 18 is an explanatory diagram showing output-error curves relative to target values of control operations carried out by the sixth embodiment and the conventional controller.

FIG. 18 shows error curves representing differences between the desired values and outputs for varying patterns of the load. One of the curve represents errors for the conventional controller whereas the other represents those for the controller using the neural network. Patterns −400, 0 and 600 of the load are used by the neuro controller 13 at the learning phase. The other patterns are non-learning data. It is clear from FIG. 18 that the control accuracy of the neuro controller 13 provided by the present invention is improved when compared to that of the conventional one.

Figure 19:
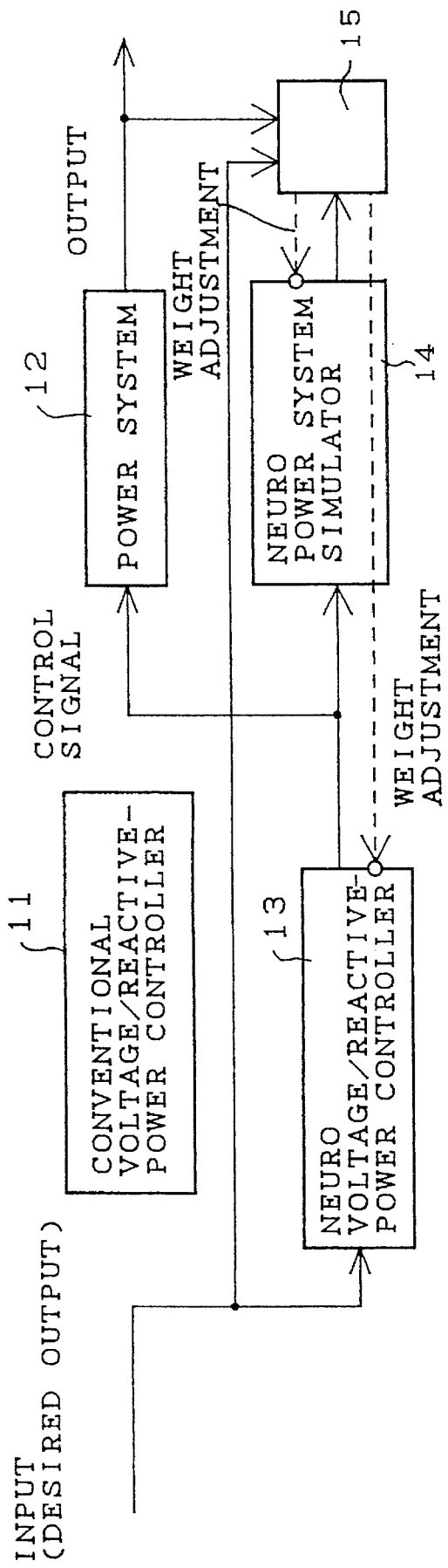
FIG. 19 is a conceptual diagram showing a seventh embodiment according to the present invention.

FIG. 19 is a conceptual diagram showing operation of a controller implemented by a seventh embodiment in accordance with the present invention. The configuration of the controller is identical with that of the sixth embodiment while its operation is the same as the second embodiment. That is, as the first and second learning phases are completed, the real power system 12 is controlled by the neuro controller 13. At that time, the neuro power-system simulator 14 are provided with the same external inputs as the real power system 12. The monitor 15 keeps track of the outputs of the real power system 12 and the neuro power-system simulator 14, i.e. the primary and secondary voltages and the primary reactive power of the transformer, comparing one to another. If the difference between them exceeds a predetermined value, the neuro controller 13 and the neuro power system simulator 14 are requested to go through a re-learning phase.

Figure 15:
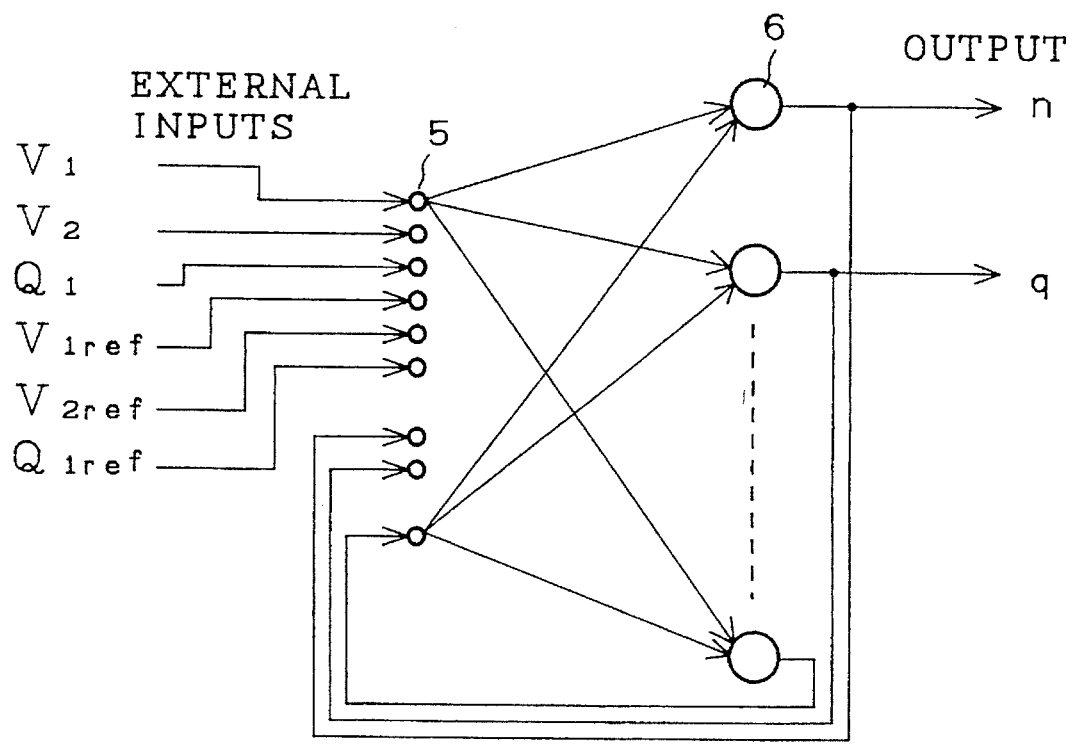
FIG. 15 is a diagram showing the configuration of a neuro controller.

As described so far, desired and current values of the primary and secondary voltages and the primary reactive power of the transformer are set as external inputs to the neuro controller 13 as shown in FIG. 15. In addition, the primary and secondary voltages and the primary reactive power of the transformer are selected as outputs of the neuro power-system simulator 14 as shown in FIG. 14. It should be noted, however, that the following control schemes can also be adopted as well.

If it is desired to control only the transformer's primary and secondary voltages as is the case with the conventional technique, only the desired and current values of these voltages are supplied to the neuro controller 13 as its external inputs and only the transformer's primary and secondary voltages are selected as the outputs of the neuro power-system simulator 14.

As an alternative, only the secondary voltage and the primary reactive power of the transformer are used as control variables like another scheme of the conventional method. To be more specific, only desired and current values of the transformer's secondary voltage and primary reactive power are supplied to the neuro controller 13 as its external inputs and only the transformer's secondary voltage and primary reactive power are selected as the outputs of the neuro power-system simulator 14.

Figure 20:
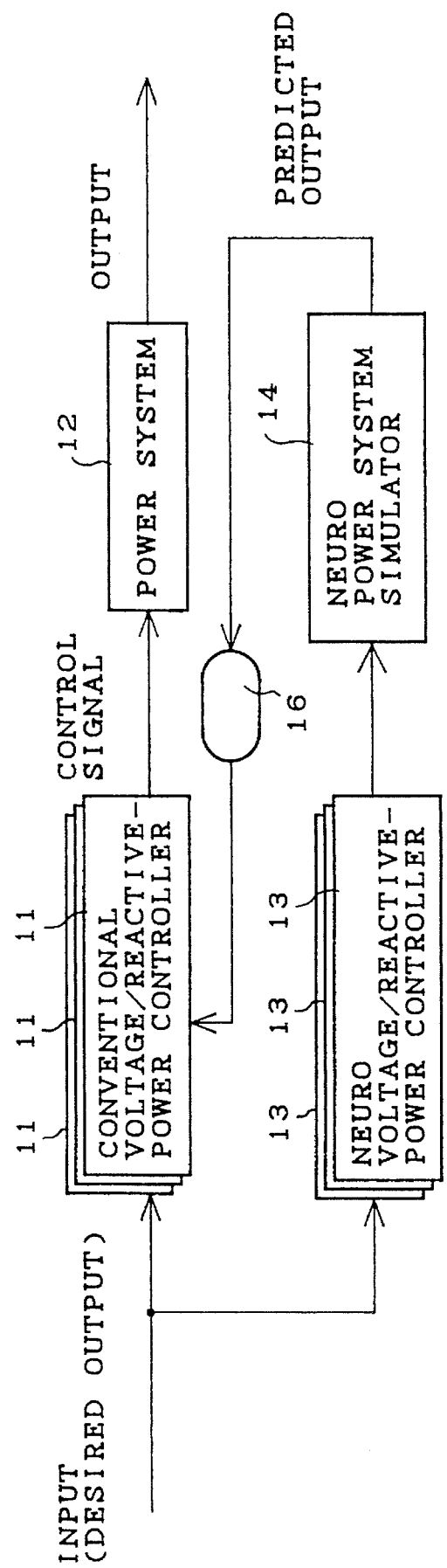
FIG. 20 is a conceptual diagram showing an eighth embodiment according to the present invention.

FIG. 20 is a conceptual diagram showing operation of an eighth embodiment implementing a look-ahead typed voltage/reactive-power controller in accordance with the present invention. The control system is configured to comprise a plurality of conventional voltage/reactive-power controller 11 based on different types of control logic, a plurality of neuro controller 13 learning the characteristics of the conventional voltage/reactive-power controller 11 and a neuro power-system simulator 14 learning the characteristics of a real power system 12.

The control system effectively takes advantage of the fact that an operation of the neural network after learning stage is executed at a very high speed. Control effects of each of the existing voltage/reactive-power controller 11 on a state of the real power system 12 are found in advance by simulation using the neuro controller 13 and the neuro power-system simulator 14 prior to the actual control. Based on results of the simulation, a switch/decision unit 16 selects a neuro controller 13 which has the most desirable effects, switching the connection of the real power system 12 to the selected controller 13. The connected neuro controller 13 then executes control operations on the real power system 12.

By applying the look-ahead control utilizing the high speed of the neural networks as such, the most effective controller and control variables which are useful in approaching the target values of the voltages and the reactive power of the transformer can thus be determined.

Figure 21:
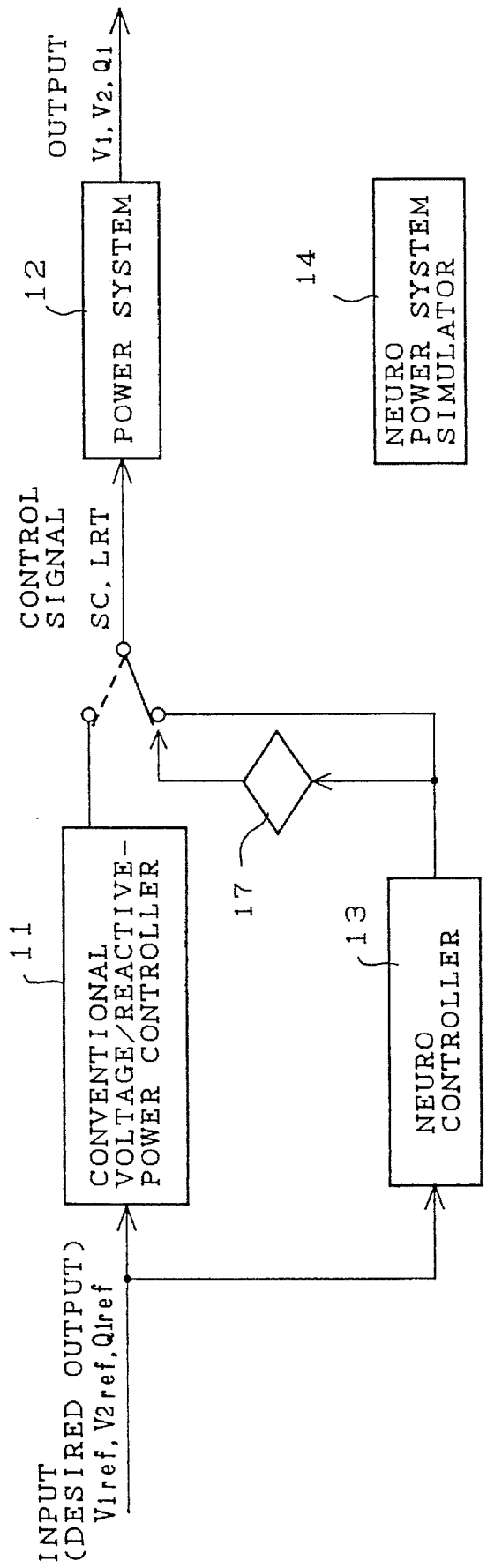
FIG. 21 is a conceptual diagram showing a ninth embodiment according to the present invention.

FIG. 21 is a conceptual diagram showing a nineth embodiment according to the present invention. At a stage where the neuro controller 13 having gone through a learning phase in accordance with the same procedure as the sixth embodiment controls the real power system 12, the conventional voltage/reactive-power controller 11 is also provided with the same input as the neuro controller 13. A switch/decision unit 17 monitors the control output of the neuro controller 13. If the control output goes beyond a predetermined range, the switch/decision unit 17 changes over the connection of the real power system 12 from the neuro controller 13 to the conventional voltage/reactive-power controller 11 so that the real power system 12 is controlled by the latter controller 11. By monitoring the control output of the neuro controller 13 as such, degradation of control performance caused by inputting a system state far beyond the scope of a learning process can thus be avoided.

Next, a tenth embodiment according to the present invention is described. FIG. 22 are conceptual diagrams used for explaining the operation of a voltage/reactive-power controller 13 for controlling a power system by means of a neural network. Reference numeral 11 shown in the figure is the conventional voltage/reactive-power controller whereas reference numeral 12 denotes a power system controlled by the voltage/reactive-power controller 11. The neuro controller 13 is made up of a neural network for performing functions of the voltage/reactive-power controller 11. A recurrent neural network shown in FIG. 15 is a typical configuration of the neuro controller 13. As shown in the figure, inputs to the neuro controller 13 are reference values $V_{1ref}$, $V_{2ref}$ and $Q_{1ref}$ of the primary and secondary voltages and the primary reactive power of the transformer, and variables of the power system which are typically represented by current values $V_1$, $V_2$ and $Q_1$ of the primary and secondary voltages and the primary reactive power of the transformer respectively. Outputs of the neuro controller 13 are control signals (n) and (q) for moving up and down the tap of the tap-changer and closing and opening phase adjusting facilities SC and SHR respectively.

The principle of operation of these elements is the same as that of the fourth embodiment. First of all, the neuro voltage/reactive-power controller 13 learns dynamic characteristics of the conventional voltage/reactive-power controller 11 as shown in FIG. 22(a). The neuro voltage/reactive-power controller 13 then controls the real power system 12, replacing the conventional voltage/reactive-power controller 11 as shown in FIG. 22(b).

Figure 23:
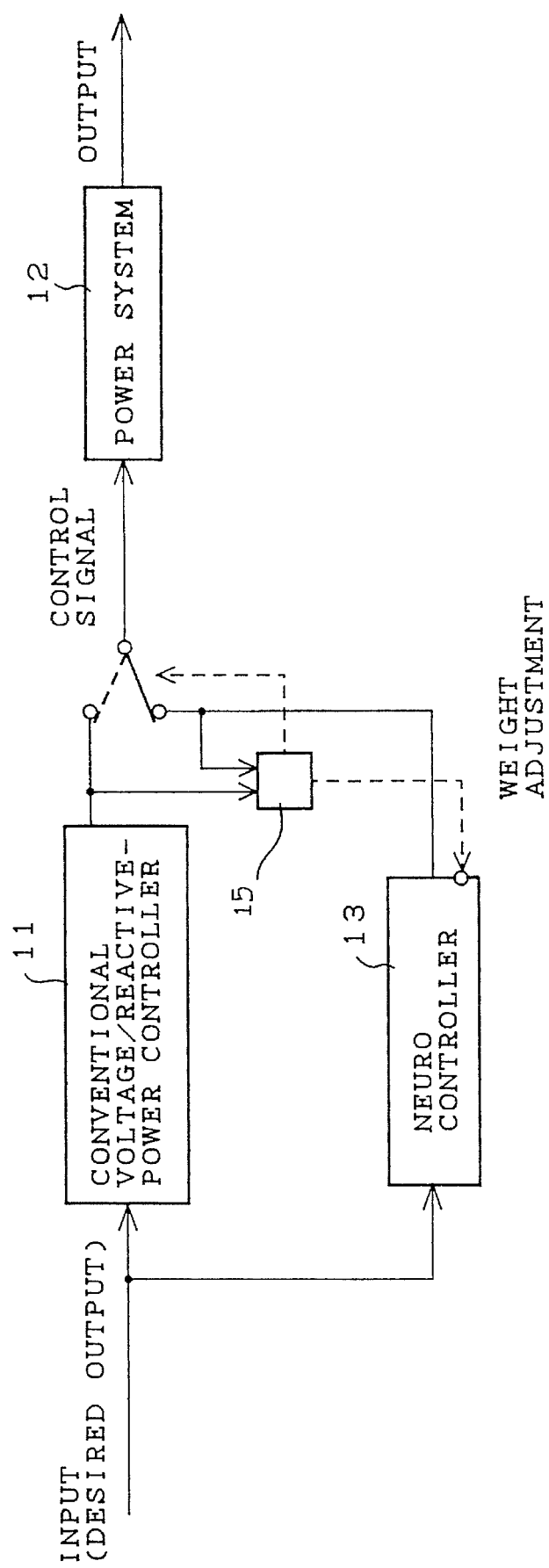
FIG. 23 is a conceptual diagram showing an eleventh embodiment according to the present invention.

FIG. 23 is a conceptual diagram showing operation implemented by an eleventh embodiment in accordance with the present invention. The configuration of the apparatus is identical with that of the tenth embodiment while its operation is carried out in the same as the second embodiment. That is to say, while the neuro controller 13 is controlling the power system 12 after completing a learning phase, the same input is also supplied to the conventional voltage/reactive-power controller 11 as well. A monitor 15 keeps track of the outputs of the neuro controller 13 and the voltage/reactive-power controller 11. If the difference between the two outputs exceeds a predetermined value, the control of the power system 12 is switched from the neuro controller 13 to the voltage/reactive-power controller 11.

In this embodiment, target and current values of the primary and secondary voltages and the primary reactive power of the transformer are supplied to the neuro voltage/reactive-power controller 13 as external inputs. It should be noted, however, that only target and current values of the transformer's primary and secondary voltages can be supplied thereto as external inputs if it is desired to control these voltages only as is the case with the conventional technique.

As an alternative, only the secondary voltage and the primary reactive power of the transformer can be controlled like another scheme of the conventional method. To be more specific, only target and current values of the transformer's secondary voltage and primary reactive power are supplied to the neuro voltage/reactive-power controller 13 as external inputs.

As described earlier, the neuro controller and the neuro control-object simulator are each made up of a neural network. The weights of connection among neural nodes constituting the neural network of the neuro controller are adjusted to match dynamic characteristics of a real control object. Likewise, the weights of connection among neural nodes constituting the neural network of the neuro control-object simulator are adjusted to match dynamic characteristics of a conventional controller. Subsequently, by linking both the neural networks to each other and letting the neuro controller learn the characteristics of the conventional controller with the dynamic characteristics of the real control object taken into consideration, a control technique adaptable to any arbitrary control object can be implemented even if it is difficult to control the control object using the conventional control technique. In addition, the control technique provided by the present invention is also applicable to a control object for which parameters of the conventional controller are difficult to set, or a control object for which the conventional controller yields unsatisfactory control results.

In addition, each of the neuro controller is made up of a neural network which adjusts the weights of connection among neural nodes constituting the neural network, until its characteristics match the dynamic characteristics of the conventional voltage/reactive-power controller. The neuro controller can be configured so as to give the same characteristics as the conventional controller. In this case, the resulting configuration will be simpler than that of the conventional controller and, at the same time, it is also possible to increase its control speed.

Furthermore, if the control technique utilizing neural networks is applied to the control of voltages and reactive power of a power system, the primary and secondary voltages and the primary reactive power of the transformer can be controlled to appropriate values at a higher degree of accuracy and at a higher speed than the conventional controller.

What is claimed is:

1. A control method for controlling a control object by means of a neuro controller made up of a recurrent neural network, said control method comprising the steps of:

connecting said neuro controller in parallel to a control unit having functions for controlling said control object and connecting in parallel to said control object a neuro control-object simulator made up of a recurrent neural network for simulating said control object;

operating said neural network of said neuro controller and a neural network making up said neuro control-object simulator to perform a pre-learning phase so as to make input-output relations of said neuro controller match input-output relations of said control unit, and so as to make in said pre-learning phase input-output relations of said neuro control-object simulator match input-output relations of said control object;

connecting the output and the input of said neuro controller to the input and the output, respectively of said neuro control-object simulator;

operating said neural network of said neuro controller to perform a re-learning phase so as to make the output of said neuro control-object simulator match the input of said neuro controller; and thereafter connecting said neuro controller to control said control object after completing said re-learning phase and thereafter controlling said control object using only said neuro controller.

2. A control method according to claim 1, further comprising a step of comparing the output of said control object to the output of said neuro control-object simulator after said re-learning phase and causing said neuro controller and said neuro control-object simulator go through a second re-learning phase if the difference between said outputs exceeds a predetermined value.

3. A voltage/reactive power controller for controlling voltages and reactive power of a power system comprising:

a voltage/reactive-power control unit having functions for controlling a power system;

a neuro control-object simulator made up of a first recurrent neural network, wherein said first recurrent neural network has undergone a pre-learning process so as to make input-output relations of said neuro control-object simulator match input-output relations of said power system; and a neuro controller made up of a second recurrent neural network, wherein said second recurrent neural network has undergone a pre-learning process so as to make input-output relations of said second recurrent neural network match input-output relations of said voltage/reactive-power control unit and has further undergone a re-learning process so as to make the output of said neuro control-object simulator match the input of said neuro controller, said power system being connected to be controlled only by said neuro controller after said pre-learning and re-learning processes have been completed.

4. A voltage/reactive-power controller according to claim 3, wherein said voltage/reactive-power control unit has a power pattern approximating characteristics of a power system and controls said power system based on said pattern.

5. A voltage/reactive-power controller according to claim 3, wherein said neuro control-object simulator receives control signals from said neuro controller even after said learning processes have been completed and a monitor is further incorporated therein for comparing the output of said power-system to the output of said neuro control-object simulator and for issuing a request to said neuro controller to undergo a re-learning process if the difference between said outputs exceeds a predetermined value.

6. A voltage/reactive-power controller according to claim 3, further including a deciding unit for keeping track of control signals of said neuro controller and altering connections so that said power system is controlled by said control unit if any of said control signals exceeds a predetermined value.

* * * * *

UNITED STATES PATENT AND TRADEMARK OFFICE
CERTIFICATE OF CORRECTION

PATENT NO. : 5,485,545
DATED : January 16, 1996
INVENTOR(S) : Yasuhiro Kojima et al.

It is certified that error appears in the above-indentified patent and that said Letters Patent is hereby corrected as shown below:

Col. 5, line 36 (formula #8), "$\ldots=f_k[s_k\ldots$" should be -- $\ldots=f'_k[s_k\ldots$ --; Col. 5, line 48 (formula #10), "$\ldots=f_k[s_k\ldots$" should be -- $\ldots=f'_k[s_k\ldots$ --;
In the Claims: Col. 11, line 61 (claim 1), after "respectively" insert a comma.

Signed and Sealed this

Twenty-ninth Day of October 1996

*Attest:*

BRUCE LEHMAN

*Attesting Officer*    *Commissioner of Patents and Trademarks*